(12) United States Patent
Kim et al.

(10) Patent No.: US 7,838,098 B2
(45) Date of Patent: Nov. 23, 2010

(54) VACUUM INSULATION PANEL AND INSULATION STRUCTURE OF REFRIGERATOR USING THE SAME

(75) Inventors: Kyung-Do Kim, Busan (KR); Dong-Ju Jung, Gyeongsangnam-Do (KR); Young-Bae Kim, Busan (KR)

(73) Assignee: LG Electronics Inc., Seoul (KR)

( * ) Notice: Subject to any disclaimer, the term of this patent is extended or adjusted under 35 U.S.C. 154(b) by 171 days.

(21) Appl. No.: 12/092,236

(22) PCT Filed: Nov. 14, 2006

(86) PCT No.: PCT/KR2006/004764

§ 371 (c)(1),
(2), (4) Date: Apr. 30, 2008

(87) PCT Pub. No.: WO2007/061196

PCT Pub. Date: May 31, 2007

(65) Prior Publication Data

US 2008/0280090 A1    Nov. 13, 2008

(30) Foreign Application Priority Data

Nov. 22, 2005  (KR) ............. 10-2005-0112012
Nov. 28, 2005  (KR) ............. 10-2005-0114425

(51) Int. Cl.
*B32B 1/04* (2006.01)
(52) U.S. Cl. .................... 428/69; 312/406
(58) Field of Classification Search ............ 428/69; 312/406
See application file for complete search history.

(56) References Cited

U.S. PATENT DOCUMENTS

| 4,847,140 A | 7/1989 | Jaskowski |
| 5,876,529 A | 3/1999 | Grant |
| 2004/0058119 A1* | 3/2004 | Wynne ............ 428/69 |
| 2004/0253406 A1* | 12/2004 | Hayashi et al. ...... 428/69 |

FOREIGN PATENT DOCUMENTS

| EP | 0128235 | 12/1984 |
| JP | 7-063469 | 3/1995 |
| JP | 7-096563 | 4/1995 |
| JP | 2002-048466 | 2/2002 |

* cited by examiner

*Primary Examiner*—Alexander Thomas
(74) *Attorney, Agent, or Firm*—KED & Associates, LLP

(57) ABSTRACT

Disclosed are a vacuum insulation panel and an insulation structure of a refrigerator using the same. The vacuum insulation panel comprises a core material formed by gather glass fiber, a getter having a container to receive an absorbent having quicklime of 90 wt % or greater as a main component, and a sealing cover formed to surround the core material and the getter. The core material can be formed at low cost in such a manner that glass fiber is tangled and gathered by penetrating glass wool having glass fiber using a needle. Since the getter is made of quicklime that can first remove water corresponding to a main component of the absorbent, the getter can be manufactured at low cost and has improved insulation efficiency.

4 Claims, 9 Drawing Sheets

[Fig. 1]
PRIOR ART
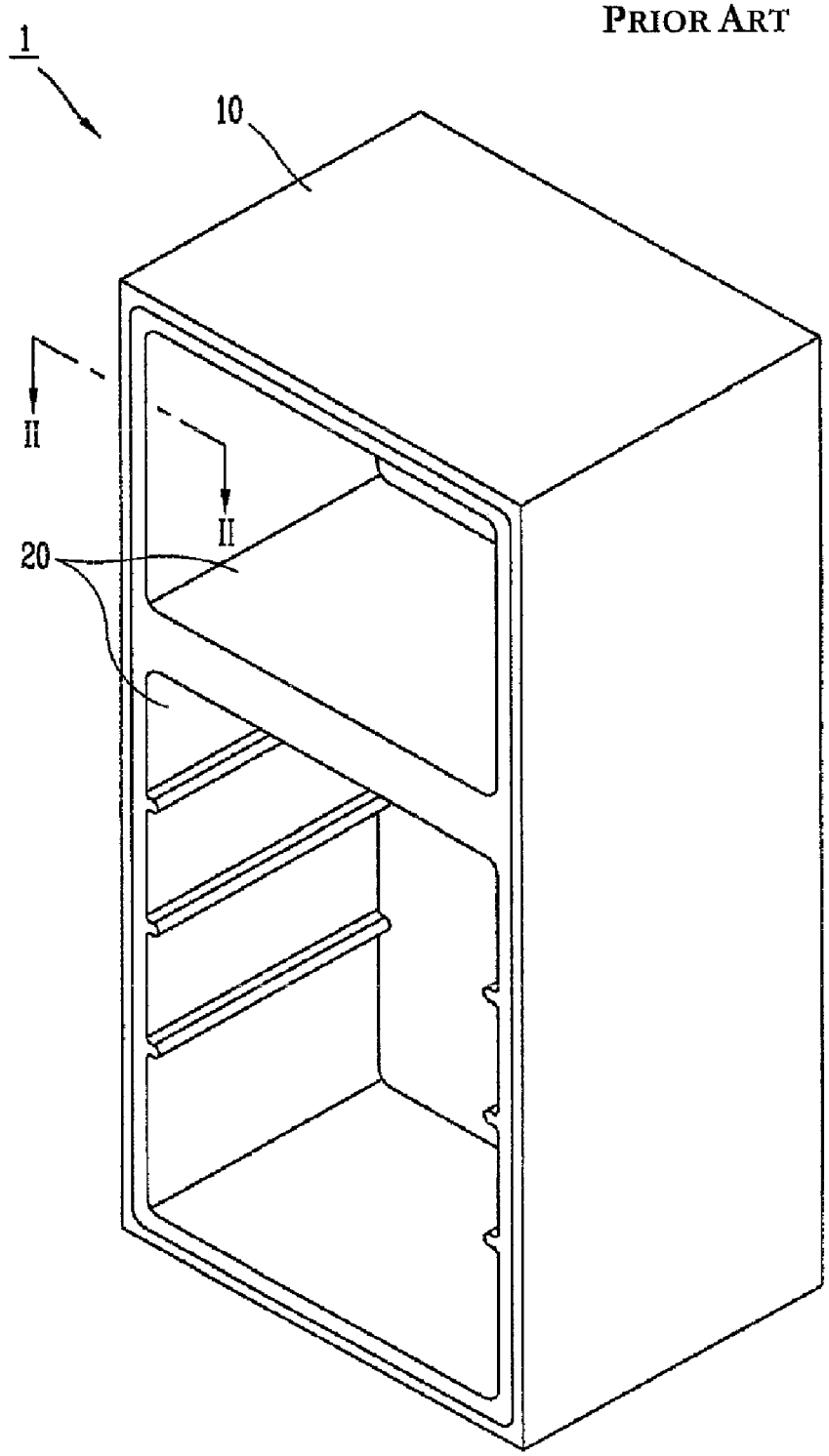

[Fig. 2]
PRIOR ART
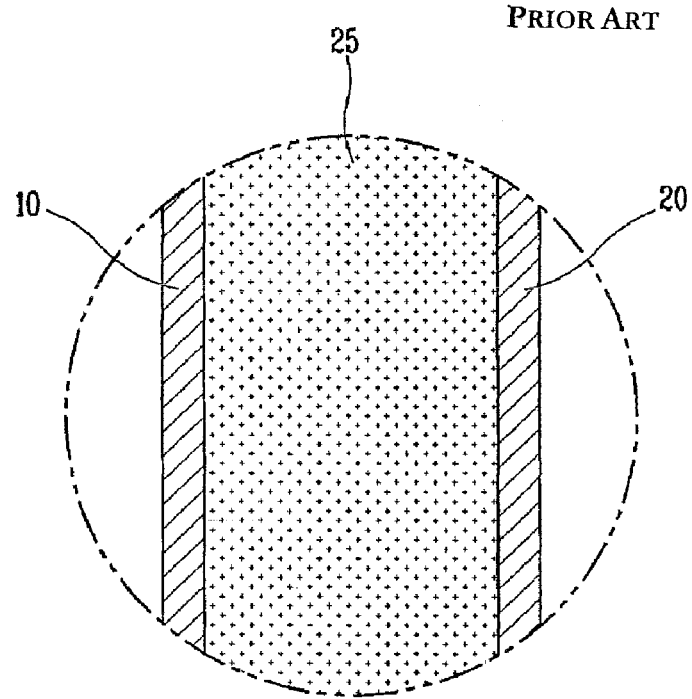
[Fig. 3]
PRIOR ART
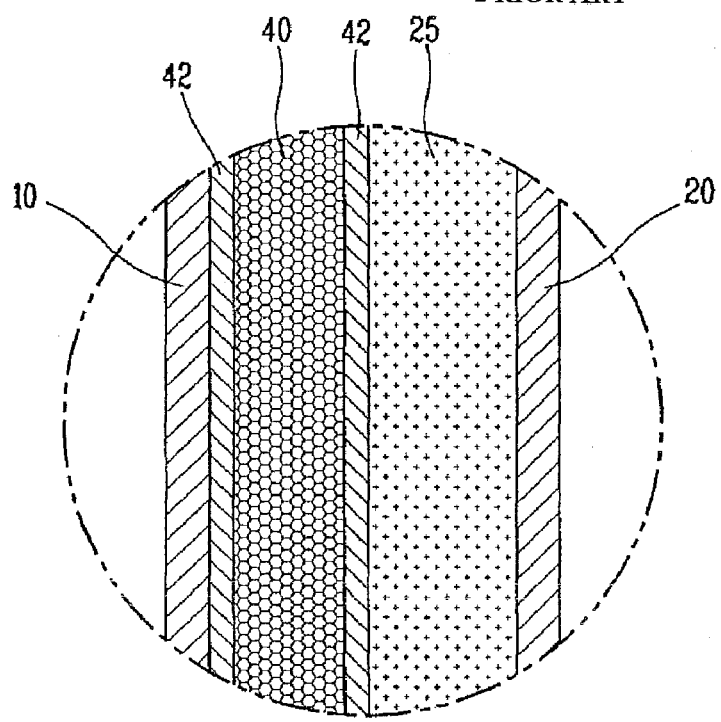

[Fig. 4]
PRIOR ART
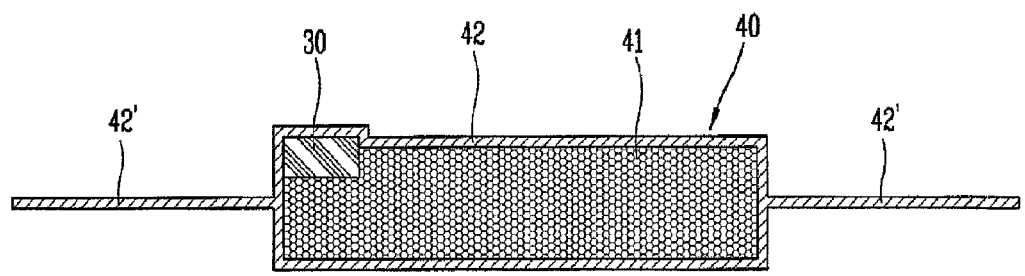
[Fig. 5]
PRIOR ART
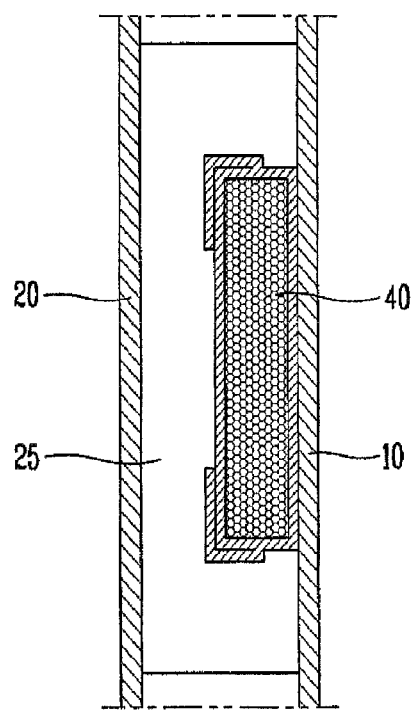

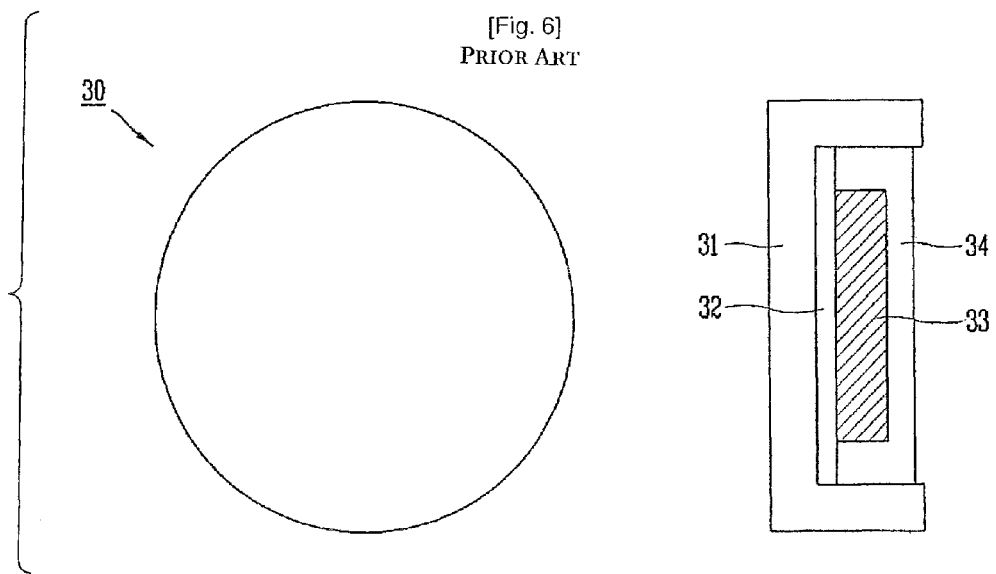
[Fig. 6]
PRIOR ART
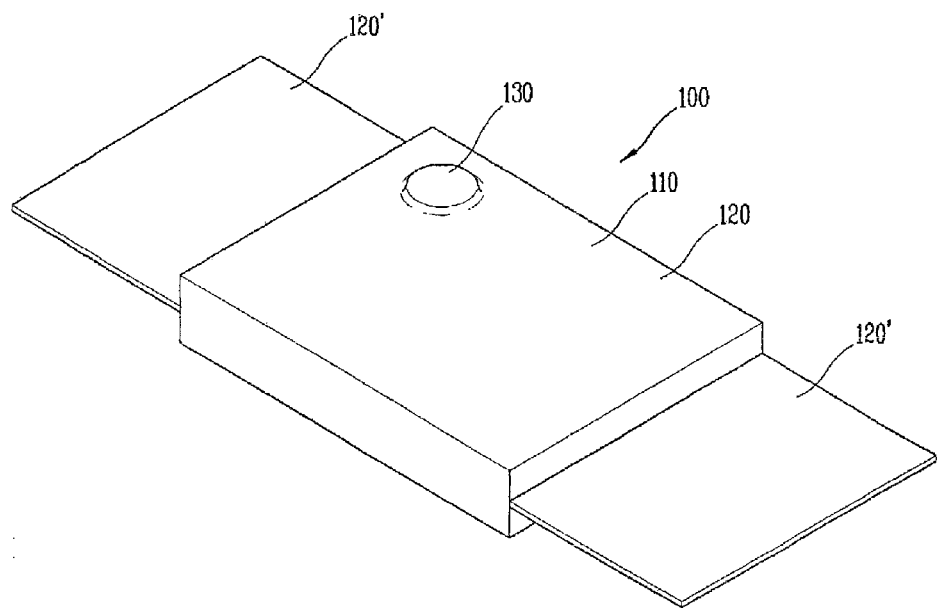
[Fig. 7]

[Fig. 8]
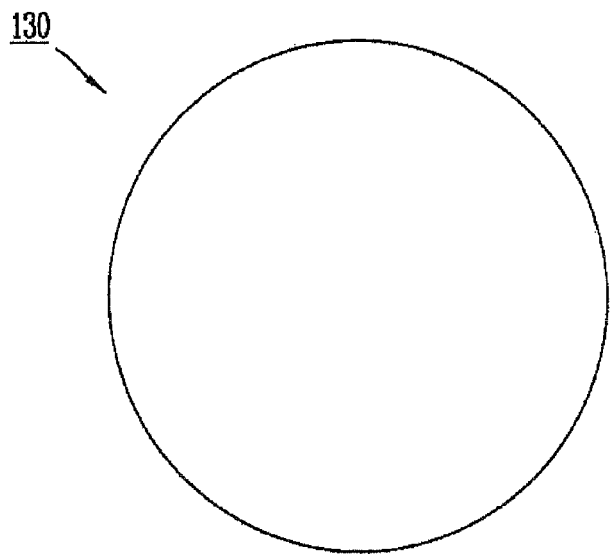 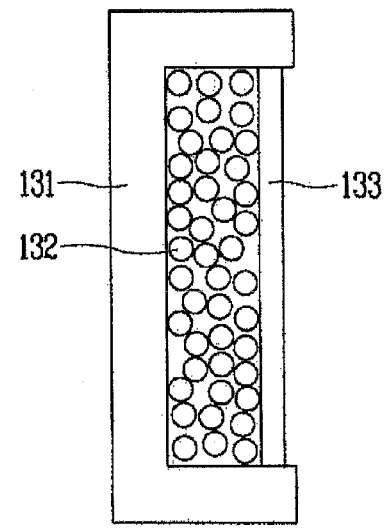
[Fig. 9]
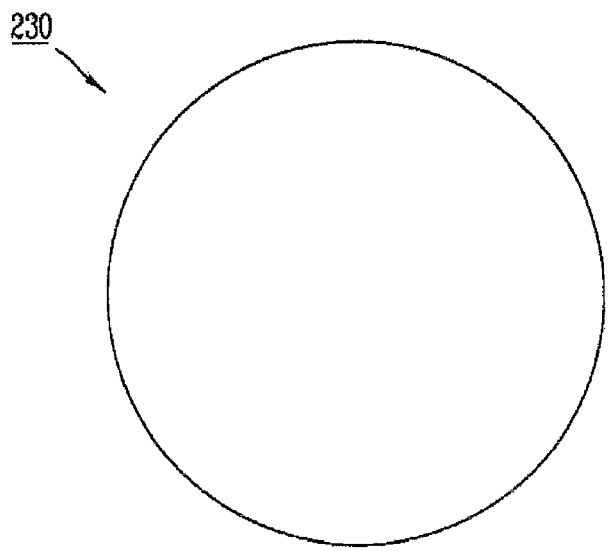 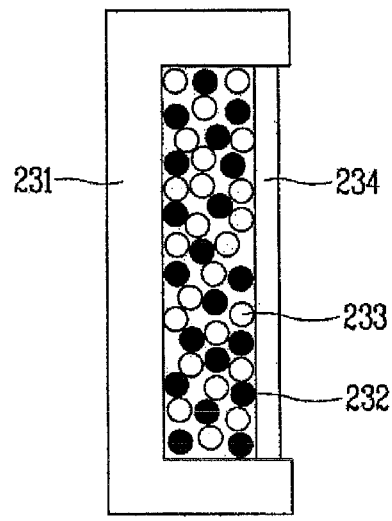

[Fig. 10]
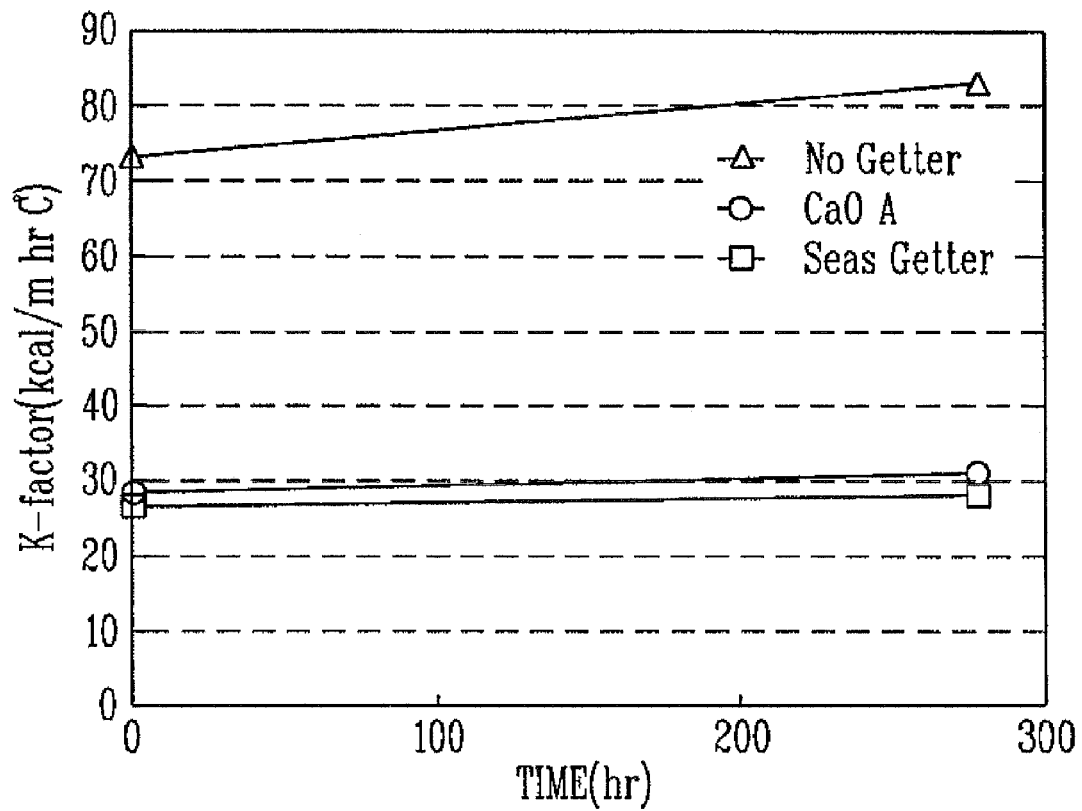
[Fig. 11]
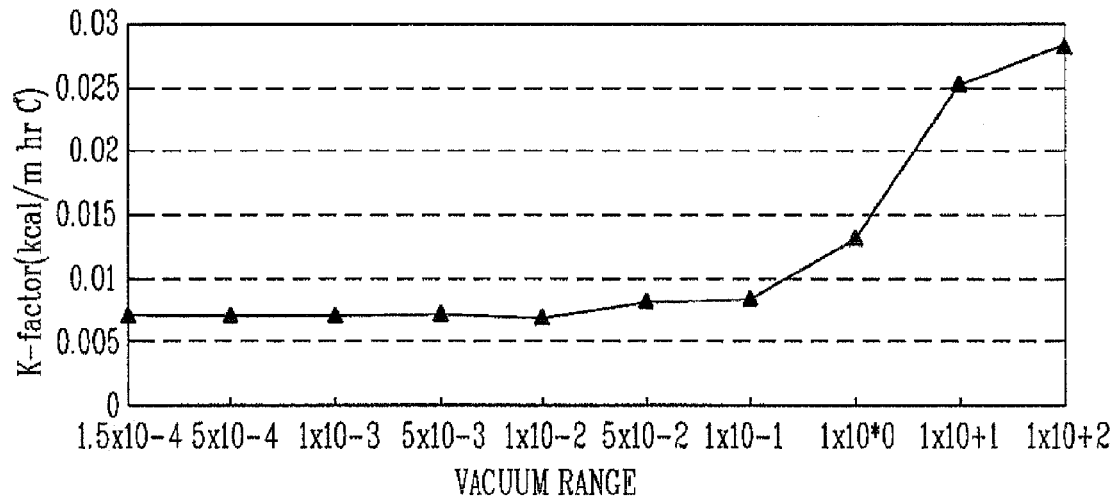

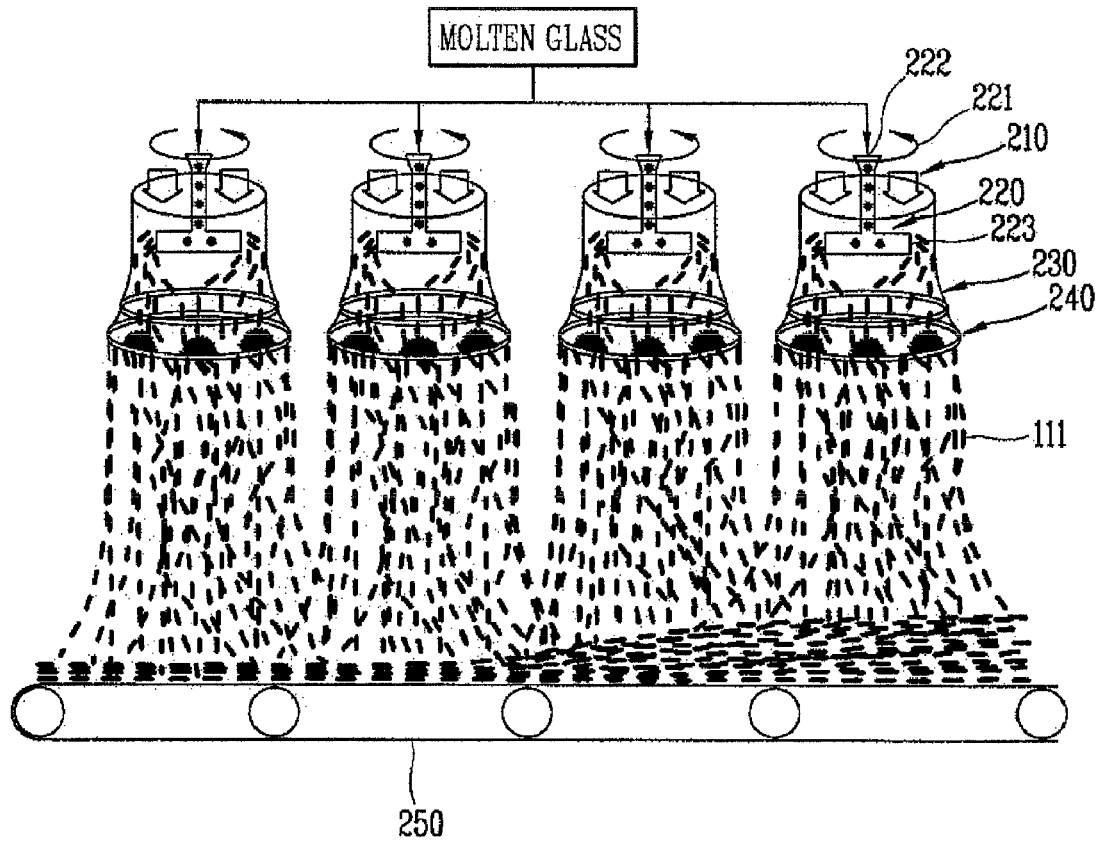
[Fig. 12]
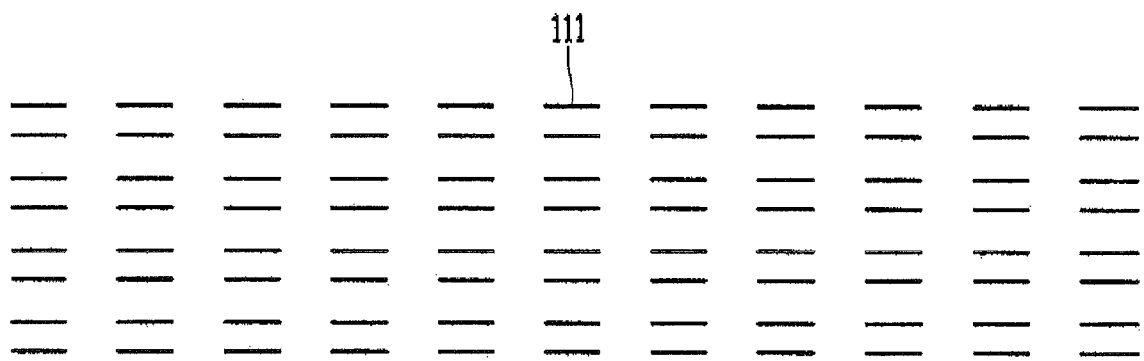
[Fig. 13]

[Fig. 14]
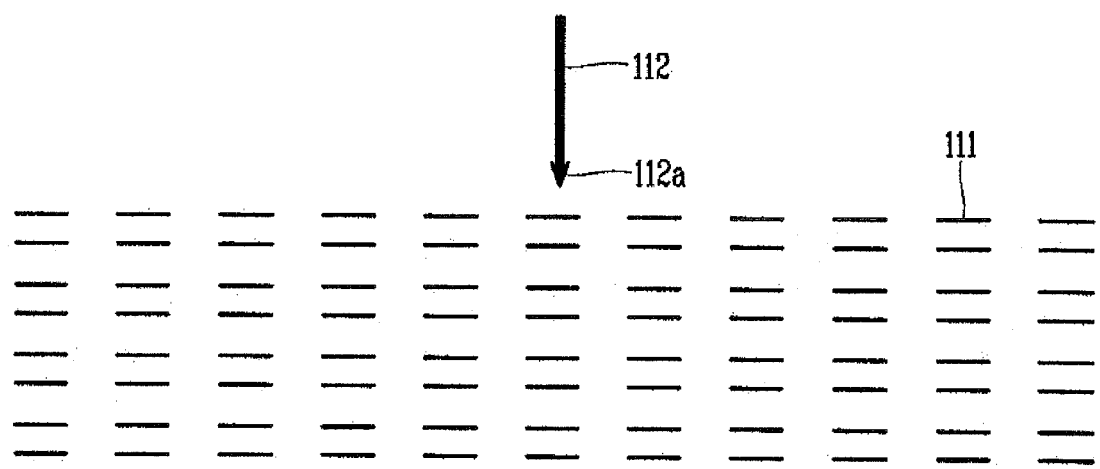
[Fig. 15]
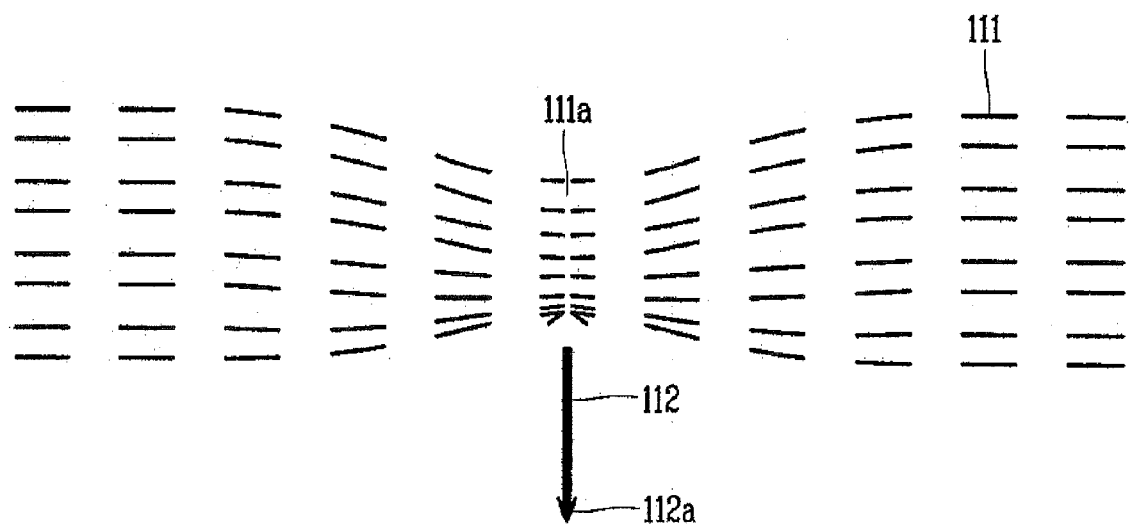

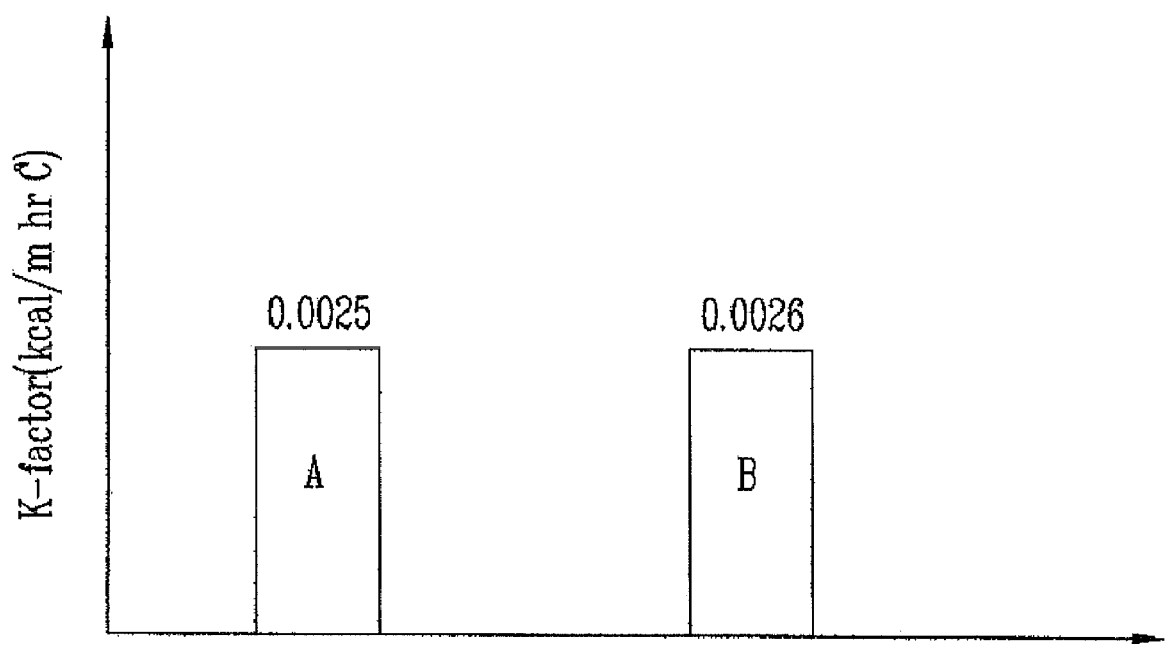
[Fig. 16]

VACUUM INSULATION PANEL AND INSULATION STRUCTURE OF REFRIGERATOR USING THE SAME

TECHNICAL FIELD

The present invention relates to a vacuum insulation panel, and more particularly, to a vacuum insulation panel, a method for manufacturing the same, and an insulation structure of a refrigerator using the same, in which a getter is manufactured at low cost and has improved insulation efficiency by first removing water between gas and water permeated into the vacuum insulation panel, and a core material is manufactured at low cost by gathering glass fiber.

BACKGROUND ART

As shown in FIG. 1, a refrigerator 1 is an apparatus for storing food at low temperature, and includes a cabinet 10 constituting a receiving space 20 for receiving food, such as a refrigerating chamber and a freezing chamber, a door (not shown) opening and closing the refrigerating chamber and the freezing chamber, and a mechanical portion (not shown) constituting a refrigerant cycle and maintaining the received food at low temperature.

The cabinet 10 is provided with an insulation material to enhance cooling insulation effect, wherein the insulation material is filled between an exterior surface constituting appearance and an interior surface constituting a receiving space. To this end, as shown in FIG. 2, a polyurethane foam solution is injected between the interior surface and the exterior surface of the assembled cabinet and then foamed by heating to form a polyurethane foam 25. However, the polyurethane foam 25 has a limitation in improving insulation efficiency due to air for transferring heat, contained therein and its thermal conductive characteristics.

Accordingly, to improve cooling efficiency and energy efficiency by shielding heat exchange between the receiving space inside the refrigerator and the outside of the refrigerator, as shown in FIG. 3, an improved insulation structure has been recently used, in which a vacuum insulation panel 40 is additionally formed between the exterior surface and the interior surface of the cabinet in addition to the insulation portion 25.

In more detail, the vacuum insulation panel 40, as shown in FIG. 4, includes a core material 41 formed of panels woven from organic glass fiber and deposited, having a vacuum state between the panels, a sealing cover 42 formed to surround the core material 41 to maintain the vacuum state of the core material 41, and a getter 30 formed to maintain insulation efficiency for a sufficient time period by removing gas component flowed through the sealing cover 42.

At this time, the vacuum insulation panel 40 can isolate the core material 41 from the outside by surrounding the core material 41 with the sealing cover 42 under the vacuum state and heating-fusion bonding two opposing surfaces of the sealing cover 42. Also, to more completely isolate the core material 41 from the outside, the two surfaces of the sealing cover 42 are heating-fusion bonded at a long length, and thus an extension sealing portion 42 protruded from the core material 41 is formed. When the aforementioned vacuum insulation panel 40 is inserted into the cabinet 10, as shown in FIG. 5, the extension sealing portion 42 protruded from the core material 41 and heating-fusion bonded is provided in a folded state.

The getter 30, as shown in FIG. 6, is manufactured by SEAS, and includes a getter container 31 provided with an opening having a receiving portion therein, a bottom part 32 formed on the bottom of the receiving portion inside the getter container 31 in a plate shape, a center part 33 formed on the bottom part 32, and a film 34 formed around the center part 33. And the bottom part 32, the center part 33 and the film 34 are made of CoO, $BaLi_4$ alloy and BaO respectively.

In other words, since the getter 30 contains components such as Ba, Zr, Ti, V and Co, which are expensive, the cost required for manufacture of the getter increases. Also, if the above components are exposed at a room temperature, a problem occurs in that heat is generated at high temperature or risk of explosion exists.

First of all, in a state that gas is rarely generated from the core material 41, although thermal conductivity of water between gas and water permeated into the vacuum insulation panel 40 through the sealing cover 42 is 10 times higher than that of gas, the related art getter is designed to remove gas only for a vacuum range, whereby there is limitation in maintaining insulation efficiency of the vacuum insulation panel 40 for a long time.

Furthermore, the core material 41, as disclosed in the International Patent Application No. PCT/JP2004/11709, may be manufactured by spraying water into a bulk fiber and pressurizing the bulk fiber at a temperature of 380° C. to control a thickness. Alternatively, the core material 41, as disclosed in the International Patent Application No. PCT/JP2003/0099552, may be manufactured at a proper thickness by spraying an organic or inorganic binder into a bulk fiber to generate binding power between glass fibers.

However, when the core material 41 is manufactured using the glass fiber, the process of heating the glass fiber or coating the binder is necessarily required. In this case, the core material 41 is manufactured at high cost in comparison with the case where the core material is manufactured using glass wool. Moreover, in a state that the vacuum insulation panel is disposed in a predetermined position, gas is likely to be leaked out of the organic or inorganic binder to cause destroy the vacuum state of the vacuum insulation panel. For this reason, another problem occurs in that an additional getter is required to prevent the vacuum state of the vacuum insulation panel from being destroyed.

Furthermore, if bulk fiber is used as a core material for the vacuum insulation panel, its thickness should be compressed five times or greater. For this reason, a problem occurs in that use of films for the sealing cover increases and it is not easy to handle the vacuum insulation panel.

DISCLOSURE OF INVENTION

Technical Problem

Therefore, an object of the present invention is to provide a vacuum insulation panel and an insulation structure of a refrigerator using the same, in which a getter is manufactured at low cost and has improved insulation efficiency by first removing water between gas and water permeated into the vacuum insulation panel.

Another object of the present invention is to provide a vacuum insulation panel and an insulation structure of a refrigerator using the same, in which a core material is manufactured at low cost using glass fiber without deterioration of insulation efficiency.

Further another object of the present invention is to provide a vacuum insulation panel and an insulation structure of a refrigerator using the same, in which a thickness of a core material is greatly reduced without a separate additive when the core material of the vacuum insulation panel is manufactured using glass fiber, so that gas generated from the inside of the manufactured vacuum insulation panel is minimized to maintain insulation efficiency for a long time.

Technical Solution

The present invention is to provide a method for controlling a thickness of glass fiber through gather fiber without separate process steps such as inserting step of an additive and heating and compressing steps. Also, the present invention is to apply the method for controlling a thickness of glass fiber to a method for manufacturing a core material of a vacuum insulation panel.

To achieve these and other advantages and in accordance with the purpose of the present invention, as embodied and broadly described herein, there is provided a vacuum insulation panel, which comprises a core material formed by gathering glass fiber, a getter including a container and an absorbent having quicklime of 90 wt % or greater as a main component, the absorbent being received in the container, and a sealing cover formed to surround the core material and the getter.

The present invention is to improve insulation efficiency of the vacuum insulation panel by removing water permeated from the outside considering that removing water inside the vacuum insulation panel is required to maintain the vacuum state of the vacuum insulation panel for a long time.

This is to ensure high insulation effect of the vacuum insulation panel by using an absorbent having quicklime as a main component, which can first remove water, because water permeated from the outside affects a degree of destroying vacuum 10 times more than other gas due to its thermal conductivity of water in the range of 0.001 to 1.0 btu/hour.ft.F unlike thermal conductivity of gas in the range of 0.001 to 0.1 btu/hour.ft.F.

To this end, the absorbent having quicklime as a main component, which can remove water of 25 to 35% of load, is inserted to the getter of the vacuum insulation panel according to the present invention. As apparent from a reaction equation, $quicklime+H_2O\rightarrow Ca(OH)_2$, quicklime can contain a lot of water in comparison with the related art silica gel. Moreover, quicklime can stably remove water in the vacuum even at a normal temperature and its cost is cheap.

Meanwhile, components permeated into the vacuum insulation panel provided in the cabinet of the refrigerator have been investigated for 8 years. As a result, the result of Table 1 was obtained as follows.

TABLE 1

| | Component | Density | Unit | PartialPressure | Unit |
| --- | --- | --- | --- | --- | --- |
| Gas | $H_2O$ | 1.25E−01 | mol. 8 | 2.35E+03 | torr.1 |
| generated for | $O_2$ | 9.16E−05 | year | 1.70E+00 | |
| 8 years | $N_2$ | 3.66E−04 | | 6.79E+00 | |
| | $H_2$ | 4.75E−08 | | 8.82E−04 | |
| | $C_6H_8$ | 2.35E−08 | | 4.37E−04 | |
| | $CO_2$ | 4.07E−05 | | 7.56E−01 | |
| | $C_4H_7$ | 1.42E−08 | | 2.65E−04 | |
| | $C_4H_8$ | 1.36E−08 | | 2.53E−04 | |
| Degree of destroying vacuum | | | | 2.10E+02 | torr |

In other words, it is noted that $H_2O$ is higher than other gases in the density of gas generated for 8 years. Also, molecules that can be absorbed by quicklime exist as follows depending on types of quicklime.

TABLE 2

| Type | Molecules that can be absorbed by quicklime |
| --- | --- |
| 3A | He, Ne, Ar, $NH_3$, $H_2$, $O_2$, $N_2$, $H_2O$ |
| 4A | Kr, Xe, $CH_4$, $C_2H_6$, $CH_3OH$, $CH_3CN$, $CH_3NH_2$, $CO_2$, $H_2S$, $SO_2$, $CS_2$ |
| 5A | n-$C_4H_{10}$~$C_{18}H_{38}$, $C_2H_6$, $C_2H_5Cl$, $C_2H_5Br$, $CF_4$, $CHF_2Cl$, $CHF_3$, $(CH_3)_2NH$, $CH_3J$, Cyclopropane, Freon12 |
| 10X | $SF_6$, $CHCl_3$, $CHBr_3$, $CHJ_3$, I—$C_4H_{10}$~$C_{14}H_{30}$, $C_6H_6$, Cycolhexane, Thiophen, Furan, Pyridin, Dixane, Naphtalin, $B_{10}H_{14}$, $(CH_3)_2CO$, $C_6H_5(CH)_3$, $(CH_3)_3N$, $(C_2H_5)_{20}$, Freon12 |
| 13X | Triethylbenzol, Dekahydrochrysen |

In other words, it is noted that quicklime can stably remove water and also can remove various gases through absorption depending on its types. Accordingly, high insulation efficiency can be obtained even if the absorbent of the getter is made of quicklime.

The core material of the present invention can be formed at low cost in such a manner that glass fiber is tangled and gathered to obtain gather fiber by penetrating glass wool having glass fiber using a needle without heating using water or applying an organic or inorganic binder. Thus, gas can be prevented from being generated from the inside of the core material even in a state that the vacuum insulation panel is completely processed. Moreover, since the thickness of the gathered glass fiber is controlled by controlling the thickness and the number of needles per unit area, which penetrate glass wool, a separate compression process is not required.

The needle is provided with a needle hook. If the needle provided with a needle hook penetrates glass wool to obtain gather glass fiber, tangling and gathering effect of glass fiber can be maximized. As the needle penetrates glass fiber, the core material is thinly gathered at a thickness of 10% to 60% of the thickness D of glass wool which is not gathered. If the thickness D of the core material gathered by penetration through the needle becomes smaller than 10% in comparison with the original thickness D, vacuum exhaustion is not desirably made during the process of manufacturing the vacuum insulation panel to put the core material in the vacuum state. For this reason, since thermal conductivity exceeds 0.005 kcal/mhr ° C., it is difficult to obtain desired insulation efficiency.

If the thickness D of the core material gathered by penetration through the needle becomes greater than 60% in comparison with the original thickness D, the core material is likely to be crushed. When the core material is put in the sealing envelope formed by a sealing cover, the envelope has a too large size. Also, in the process of manufacturing the vacuum insulation panel, a spare portion of the envelope is folded after vacuum exhaustion. In this case, considering that the folded portion forms thermal bridge, folded portions increase due to the too large sized envelope, whereby insulation efficiency is deteriorated.

Accordingly, according to the experimental result of the inventor of this application, as shown in FIG. 16, if the vacuum insulation panel is manufactured by forming the core material at a thickness D of 25% of the original thickness D, an initial thermal conductivity coefficient of the vacuum insulation panel was measured at 0.0026 kcal/mhr ° C. In case of the core material A whose thickness is controlled by an organic or inorganic binder, the initial thermal conductivity coefficient of the vacuum insulation panel was measured at 0.0025 kcal/mhr ° C. Thus, these values belong to an error range of ±0.0030 of measuring equipment.

In other words, it is noted that the core material of the vacuum insulation panel according to the present invention has the initial thermal conductivity coefficient similar to that of the related art core material manufactured at high cost even though the core material of the present invention is manufactured at low cost. Moreover, considering that the related art core material A has insulation efficiency which is not maintained for a long time due to gas exhausted from the organic or inorganic binder, the core material B of the present invention can maintain high insulation efficiency for a longer time.

At this time, the glass fiber has an average diameter of 1.5 µm to 9 µm. If the average diameter of the glass fiber is less than 1.5 µm, its manufacturing cost rapidly increases two times to ten times of the manufacturing cost of the glass fiber having the average diameter of 7 µm. If the average diameter of the glass fiber is more than 9 µm, porosity of the glass fiber is deteriorated when the vacuum insulation panel is manufactured, whereby thermal conductivity is deteriorated at 30% or greater in comparison with the minimum value.

The glass fiber is gathered by combination of a long fiber and a short fiber. Although the long fiber may not be included in the glass fiber, it is preferably included in the glass fiber in plenty in view of needling, which serves to gather the glass fiber by penetrating the glass fiber using a needle and control a thickness of the glass fiber. However, if the glass fiber has a short fiber less than 75% and a long fiber more than 25%, thermal conductivity is deteriorated at 30% or greater in comparison with the minimum value. Accordingly, it is preferable that the long fiber does not exceed ¼ of the short fiber.

For reference, the short fiber has a length of 2.5 cm to 3.8 cm and its examples include cotton and wool. The long fiber is referred to as filament and has a long length to reach 1000 m.

As shown in FIG. 11, the vacuum range of the core material surrounded by the sealing cover is rapidly deteriorated if it is greater than 0.1 Torr. Accordingly, the vacuum range of the core material is preferably in the range less than 0.1 Torr.

Meanwhile, the present invention provides a vacuum insulation panel comprising a core material formed by gathering a glass fiber using a needle, a getter having quicklime and zeolite, and a sealing cover formed to surround the core material and the getter. This is to effectively remove gas and water permeated into the vacuum insulation panel using quicklime removing water and zeolite removing gas if gas should be removed in plenty relatively more than that of water depending on purpose of use of the vacuum insulation panel. At this time, quicklime and zeolite are formed in a shape of a grain having a diameter of 1 mm to 5 mm. If the diameter of the grain is smaller than 1 mm, water or gas permeated into the vacuum insulation member fails to contact quicklime or zeolite, whereby efficiency to remover water or gas is deteriorated. If the diameter of the grain is greater than 5 mm, plenty of quicklime or zeolite cannot be contained in the getter container.

Since thermal conductivity coefficient rapidly increases if the vacuum range of the vacuum insulation panel exceeds 0.1 Torr, the vacuum range of the core material surrounded by the sealing cover is preferably less than 0.1 Torr.

Zeolite and quicklime are mixed with each other at a weight ratio of 20:80 to 45:55. This is because that insulation efficiency of the vacuum insulation panel is affected by water more greatly than by gas.

Furthermore, the present invention provides an insulation structure of a cabinet of a refrigerator, which includes an exterior surface of the cabinet formed of rigid material, an interior surface of the cabinet formed of plastic material, and a vacuum insulation panel disposed between the exterior and interior surfaces of the cabinet. In this case, the insulation structure may further include a refrigerator insulation portion formed of foam between the exterior and interior surfaces of the cabinet.

Meanwhile, the present invention provides a method for controlling a thickness of a glass fiber, which includes the steps of gathering the glass fiber and controlling the thickness of the glass fiber by penetrating the glass fiber using a needle. In this case, it is possible to obtain a gathered glass fiber of a desired thickness at lower cost even without coating an additive.

Furthermore, the present invention provides a method for manufacturing a core material of a vacuum insulation panel, which includes the steps of controlling a thickness of a gathered glass fiber by penetrating the glass fiber using a needle. In this case, it is possible to obtain a core material of a gathered glass fiber of a desired thickness at lower cost even without coating an additive.

In order to effectively tangle the glass fiber, the glass fiber can be woven using a needle even if water is not completely dried.

The step of controlling the thickness of the gathered glass fiber includes penetrating a unit area of the glass fiber using a large number of needles if the thickness of the glass fiber is thin.

Meanwhile, the present invention provides a method for manufacturing a vacuum insulation panel, which includes gathering the glass fiber using a needle, and surrounding the gathered glass fiber as a core material using a sealing cover.

In this case, to manufacture glass wool made of the glass fiber, the method further includes the steps of injecting a glass solution into a rotating spinner having a passage, rotating the spinner and blowing the spinner from the top, collecting the glass fiber in a conveyer, the glass fiber dropping from the spinner by means of a centrifugal force, and drying the glass fiber on the conveyer. At this time the method may further include the step of pressurizing the gathered glass fiber.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a perspective view illustrating a cabinet of a refrigerator;

FIG. 2 is a sectional view illustrating a related art insulation structure taken along line II-II of FIG. 1;

FIG. 3 is a sectional view illustrating another related art insulation structure of FIG. 2;

FIG. 4 is a sectional view illustrating a vacuum insulation panel of FIG. 3;

FIG. 5 is a side sectional view illustrating the state that a vacuum insulation panel of FIG. 4 is provided in a cabinet of a refrigerator;

FIG. 6 illustrates a getter of FIG. 4;

FIG. 7 is a perspective view illustrating a vacuum insulation panel according to one embodiment of the present invention;

FIG. 8 illustrates a getter of FIG. 7;

FIG. 9 illustrates another getter of FIG. 7;

FIG. 10 is a graph illustrating experimental data of variation by time passage in thermal conductive characteristics of a vacuum insulation panel using a getter of FIG. 8 and a vacuum insulation panel using a related art getter;

FIG. 11 is a graph illustrating experimental data of variation in thermal conductive characteristics depending on a vacuum range of a vacuum insulation panel;

FIG. 12 is a schematic view illustrating an apparatus for generating a glass fiber to manufacture a core material of FIG. 7;

FIG. 13 is a schematic view illustrating a glass fiber manufactured through FIG. 12;

FIG. 14 is a schematic view illustrating the state before a needle is inserted into a glass fiber of FIG. 12;

FIG. 15 is a schematic view illustrating the principle of inserting and penetrating a needle into a glass fiber and gathering the glass fiber; and FIG. 16 is a graph illustrating thermal conductivity coefficients (K-factors) of a core material according to the present invention and a related art core material.

MODE FOR THE INVENTION

Reference will now be made in detail to the preferred embodiments of the present invention, examples of which are illustrated in the accompanying drawings.

While the invention will be described in conjunction with the preferred embodiments, it will be understood that the described embodiments are not intended to limit the invention specifically to those embodiments. On the contrary, the invention is intended to cover alternatives, modifications and equivalents, which may be included within the spirit of the invention as defined by the appended claims.

Hereinafter, a getter according to one embodiment of the present invention will be described in detail.

FIG. 7 is a perspective view illustrating a vacuum insulation panel according to one embodiment of the present invention, FIG. 8 illustrates a getter of FIG. 7, FIG. 9 illustrates another getter of FIG. 7, FIG. 10 is a graph illustrating experimental data of variation by time passage in thermal conductive characteristics of a vacuum insulation panel using a getter of FIG. 8 and a vacuum insulation panel using a related art getter, and FIG. 11 is a graph illustrating experimental data of variation in thermal conductive characteristics depending on a vacuum range of a vacuum insulation panel.

As shown, a vacuum insulation panel 100 according to one embodiment of the present invention includes a core material 110 woven from glass fiber and formed by vacuum exhaustion from the woven glass fiber, a sealing cover 120 formed to surround the core material 110 to maintain the vacuum state of the core material 110, and a getter 130 inserted into the core material 110 in a layer shape to maintain insulation efficiency for a sufficient time period by removing gas component flowed through the sealing cover 120.

The core material 110 is formed of glass fiber known as having the most excellent insulation efficiency, and preferably formed by depositing panels woven from glass fiber as thin as possible, so as to obtain high insulation efficiency.

The sealing cover 120 includes an outmost layer formed of a nylon material to be exposed to an outer surface of the vacuum insulation material 100, a protective layer deposited on the bottom of the outmost layer, an aluminum layer deposited on the bottom of the protective layer, and a heating-fusion bonding layer deposited on the bottom of the aluminum layer in contact with the core material 110.

As shown in FIG. 8, the getter 130 includes a cylinder shaped getter container 131 provided with a receiving portion therein, quicklime 132 filled with grains having a diameter of 2 mm in the receiving portion of the getter container 131, and a film 133 provided with a plurality of through holes to adjoin peripheral gas and water toward the quicklime 132 and not to leak the quicklime 132 out.

As described above, since the getter 130 is filled with a material having the quicklime 132 as a main component or only the quicklime 132, water, which affects destroying the vacuum range of the vacuum insulation panel, can effectively be removed and at the same other gas can be removed, whereby the getter 130 which improves insulation efficiency of the vacuum insulation panel can be manufactured at lower cost than that of the related art getter.

At this time, the grain may not necessarily be formed in a globular shape, and is made by crushing so as to form sufficient through holes.

Meanwhile, as shown in FIG. 9, another getter 230 for the vacuum insulation panel according to the present invention includes a cylinder shaped getter container 231 provided with a receiving portion therein, a quicklime grain 232 having a diameter of 2 mm (maximum longitudinal radius in case of no globular shape) in the receiving portion of the getter container 231, a zeolite grain 233 having a diameter of 2 mm (maximum longitudinal radius in case of no globular shape) mixed with the quicklime grain 232, and a film 234 provided with a plurality of through holes so as to permeate gas and water into the getter container 231 and not to leak the quicklime grain 232 and the zeolite grain 233 out.

If gas is sufficiently permeated from the outside like water or if gas is generated from the core material 110 depending on purpose of use of the vacuum insulation panel, the zeolite grain 233 is used to adsorb gas permeated into the vacuum insulation panel. At this time, the zeolite grain 233 and the quicklime grain 232 are preferably formed at a similar size to maximize porosity.

Also, since water more adversely affects insulation efficiency of the vacuum insulation panel than gas, it is preferable that a ratio of quicklime and zeolite is in the range of 7:3.

Hereinafter, the core material according to the one embodiment of the present invention will be described with reference to the accompanying drawings.

FIG. 12 is a schematic view illustrating an apparatus for generating a glass fiber to manufacture a core material of FIG. 7, FIG. 13 is a schematic view illustrating a glass fiber manufactured through FIG. 12, FIG. 14 is a schematic view illustrating the state before a needle is inserted into a glass fiber of FIG. 12, FIG. 15 is a schematic view illustrating the principle of inserting and penetrating a needle into a glass fiber and gathering the glass fiber, and FIG. 16 is a graph illustrating thermal conductivity coefficients (K-factors) of a core material according to the present invention and a related art core material.

As shown, the core material 110 according to one embodiment of the present invention is manufactured by gathering glass wool using a needle 112. Glass wool which is a raw material of the core material 110 is manufactured by the apparatus shown in FIG. 12. In other words, in a state that a wind 210 is blown from the top of a spinner 220 to the bottom of the spinner 220, a glass melting solution is injected into inlets 222 of four rotating spinners 220 and at the same time the spinners 220 are rotated, so that the glass melting solution is exhausted to an outlet 223 little by little by a centrifugal force after passing through a pipe path inside the spinners 220. At this time, the glass fiber is guided by a bucket 230. In this way, the glass fiber 111 dropped in a gravity direction is deposited on a conveyer 250 which horizontally moves below the spinners 220. As the conveyer 250 moves, the glass fiber 111 is deposited much more, so that the glass fiber is deposited on the end of the conveyer 250 to form gathered glass wool.

As shown in FIG. 14, if the needle 112 having a needle hook 112a penetrates the glass wool deposited at a predetermined thickness D as shown in FIG. 13, the needle hook 112a of the needle 112 pushes the glass fiber to make the glass fiber tangled and gathered while penetrating the glass wool 111 as shown in FIG. 15. Accordingly, in a state that the needle 112 is penetrated into the glass wool, the glass fiber around a through hole 111a of the needle 112 is tangled to obtain a thickness D thinner than before. As a result, as shown in FIG. 15, needling is performed at a proper interval so that the glass wool is gathered and its thickness is controlled.

Prior to be inserted into the sealing cover 120, the core material 110 is maintained in a fixed form even without a separate additive, water, heating or pressurization. Accordingly, the core material can easily be manufactured at a desired shape if it is gathered by needling and its thickness is controlled. In this case, it is easy to handle the core material when the vacuum insulation panel is manufactured.

At this time, the glass fiber is formed at an average diameter of 1.5 µm to 9 µm, wherein the long fiber and the short fiber are gathered by combination of 20:80. The vacuum range inside the vacuum insulation panel is in the range of 0.1 Torr or less.

If the thickness of the core material is to be controlled more thinly, the number of needles per unit area of the glass wool increases.

Also, it is apparent that the vacuum insulation panel according to the aforementioned embodiment can be used for the insulation structure of the cabinet of the refrigerator shown in FIGS. 1 and 2, and that the insulation structure of the cabinet of the refrigerator belongs to the scope of the present invention. In the present invention, although the container provided with a separate film has been exemplarily described as a container which contains quicklime and/or zeolite, the present invention is not limited to the aforementioned container and anything which contains quicklime and/or zeolite may be used as the container.

INDUSTRIAL APPLICABILITY

As described above, according to the present invention, there is provided the vacuum insulation panel, which comprises the core material formed by gathering glass fiber, the getter having the container and the absorbent having quicklime of 90 wt % or greater as a main component, and the sealing cover formed to surround the core material and the getter.

Also, since the present invention provides a getter having quicklime and zeolite, it is possible to remove water, which greatly affects insulation efficiency of the vacuum insulation panel, along with other gas.

Since the present invention provides a getter having quicklime only or a getter having both quicklime and zeolite, it is possible to maintain excellent insulation efficiency at a cost lower than that of the related art.

Meanwhile, according to the present invention, the core material can be formed at low cost in such a manner that the glass fiber is tangled and gathered by penetrating glass wool having glass fiber using a needle without heating using water or applying an organic or inorganic binder. Thus, gas can be prevented from being generated from the inside of the core material even in a state that the vacuum insulation panel is completely processed.

Moreover, when the core material of the vacuum insulation panel is manufactured using the glass fiber, since the thickness of the core material is controlled by penetration of the needle without a separate additive, the gas generated from the inside of the manufactured vacuum insulation panel is minimized to maintain high insulation efficiency for a long time.

Since the gas generated from the inside of the vacuum insulation panel is minimized, it is possible to remove the getter or reduce its capacity, wherein the getter is conventionally used to remove the gas generated from the core material of the vacuum insulation panel.

Also, according to the present invention, the core material having the maximum efficiency can be manufactured at the minimum cost.

According to the present invention, since the surface of the vacuum insulation panel becomes smooth through needling, which serves to gather the glass fiber and control its thickness by penetrating the glass fiber using the needle, the density of the glass fiber is uniformly distributed in comparison with the related art vacuum insulation panel having no needling, whereby the vacuum insulation panel can easily be fixed to a predetermined position.

Since the glass fiber is used for manufacture of the vacuum insulation panel in a state that its thickness is controlled by needling, use of the envelope film surrounding the core material is reduced and thermal bridge is minimized, whereby high insulation efficiency can be obtained.

Also, since the glass fiber is tangled and gathered by needling, the drying process for removing water or foreign materials is more simplified in comparison with the related art drying process.

Also, the present invention provides the method for controlling the thickness of the glass fiber by gathering the glass fiber without a separate additive, heating or pressurization. Accordingly, the present invention provides the method for manufacturing the vacuum insulation panel using the method for controlling the thickness of the glass fiber.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

The invention claimed is:

1. A vacuum insulation panel comprising:
   a core material;
   a getter including quicklime and zeolite, provided on the core material; and
   a sealing cover formed to surround the core material and the getter,
   wherein the quicklime or the zeolite is formed in a grain shape having a maximum longitudinal radius of 1 mm to 5 mm.

2. The vacuum insulation panel as claimed in claim 1, wherein the core material surrounded by the sealing cover has a vacuum range of 0.1 Torr or less.

3. The vacuum insulation panel as claimed in claim 1, wherein the quicklime and the zeolite are mixed with each other at a weight ratio of 20:80 to 45:55.

4. An insulation structure of a cabinet of a refrigerator, comprising:
- an exterior surface of the cabinet formed of rigid material;
- an interior surface of the cabinet formed of plastic material; and
- a vacuum insulation panel disposed between the exterior and interior surfaces of the cabinet, including a core material, a getter including quicklime and zeolite, provided on the core material, and a sealing cover formed to surround the core material and the getter, wherein the quicklime or the zeolite is formed in a grain shape having a maximum longitudinal radius of 1 mm to 5 mm.

* * * * *